United States Patent
Eckardt et al.

(10) Patent No.: US 6,385,270 B1
(45) Date of Patent: May 7, 2002

(54) SAFETY VESSEL OF A NUCLEAR FACILITY HAVING AN IGNITION SYSTEM FOR THE RECOMBINATION OF HYDROGEN IN A GAS MIXTURE

(75) Inventors: Bernd Eckardt, Bruchköbel; Axel Hill, Stockstadt, both of (DE)

(73) Assignee: Siemens Aktiengellschaft, Munich (DE)

( * ) Notice: Subject to any disclaimer, the term of this patent is extended or adjusted under 35 U.S.C. 154(b) by 0 days.

(21) Appl. No.: 09/450,402

(22) Filed: Nov. 29, 1999

Related U.S. Application Data

(63) Continuation of application No. PCT/DE98/01378, filed on May 18, 1998.

(30) Foreign Application Priority Data

May 27, 1997 (DE) .......................................... 197 22 165

(51) Int. Cl.$^7$ ................................................ G21C 9/06
(52) U.S. Cl. .......................... 376/300; 376/301; 361/253
(58) Field of Search ................................. 376/300, 301; 423/580.1; 361/253.1; 431/268

(56) References Cited

U.S. PATENT DOCUMENTS

| | | | | |
|---|---|---|---|---|
| 4,425,495 A | | 1/1984 | Cake et al. ................... | 219/267 |
| 4,741,879 A | * | 5/1988 | McLean et al. .............. | 376/301 |
| 4,780,271 A | | 10/1988 | Dezubay et al. ............. | 376/300 |
| 4,891,181 A | * | 1/1990 | Heck ............................ | 376/300 |
| 5,108,696 A | | 4/1992 | Heck ............................ | 376/300 |
| 5,889,831 A | * | 3/1999 | Kolev .......................... | 376/300 |

FOREIGN PATENT DOCUMENTS

| | | | |
|---|---|---|---|
| DE | 3004677 | * | 8/1981 |
| DE | 3004677 C2 | | 5/1984 |
| DE | 3820187 A1 | | 2/1989 |
| DE | 3833401 A1 | | 3/1989 |
| DE | 3929327 | * | 10/1990 |
| DE | 19544346 | * | 4/1997 |
| EP | 0039826 | * | 4/1981 |
| EP | 0289907 B1 | | 11/1988 |
| EP | 0596964 B1 | | 1/1996 |

OTHER PUBLICATIONS

Heck et al.: "Hydrogen reduction following severe accidents using the dual recombiner–igniter concept," Nuclear Engineering and Design, vol. 157 (1995), pp. 315–319.*
"Hydrogen Reduction Following Severe Accidents", Reinhard Heck et al., atomwirtschaft, Dec. 1993, pp. 850–853.
"Catalytic and sparks hydrogen igniters", R. Heck, Kerntechnik 53, No. 1, 1988, Carl Hauser Verlag, München, pp. 56–58.

* cited by examiner

*Primary Examiner*—Michael J. Carone
*Assistant Examiner*—Daniel Matz
(74) *Attorney, Agent, or Firm*—Laurence A. Greenberg; Werner H. Stemer; Ralph E. Locher

(57) ABSTRACT

An ignition system has a plurality of spark igniters for the recombination of hydrogen in a gas mixture. The ignition system provides and ensures reliable early ignition of an ignitable gas mixture, even in the case of comparatively fast gas displacement. Each spark igniter is, according to the invention, configured as a high-speed igniter with an operating frequency in excess of about 10 Hz. In order to ensure reliable ignition of the ignitable gas mixture both in the event of a temporary failure of external units, and when the ignition system has a particularly long operating time, the spark igniters are advantageously connected together in groups for supplying them with energy. Each group of spark igniters is connected to an intermediate energy store common to them, and the intermediate energy stores are connected to a central energy supply unit.

10 Claims, 2 Drawing Sheets

SAFETY VESSEL OF A NUCLEAR FACILITY HAVING AN IGNITION SYSTEM FOR THE RECOMBINATION OF HYDROGEN IN A GAS MIXTURE

CROSS-REFERENCE TO RELATED APPLICATION

This is a continuation of copending International Application PCT/DE98/01378, filed May 18, 1998, which designated the United States.

BACKGROUND OF THE INVENTION

FIELD OF THE INVENTION

The invention relates to a safety vessel of a nuclear facility having an ignition system with a plurality of spark igniters for the recombination of hydrogen in a gas mixture.

A safety vessel of this type is disclosed in Published, Non-Prosecuted German Patent Application DE 38 20 187 A.

In a nuclear facility, in particular in a nuclear power station, if there are situations in which an incident or accident occurs, in which oxidation of zirconium may occur, for example on account of the heating of the core, then the formation and release of hydrogen gas and carbon monoxide within the safety vessel or containment enclosing the reactor core must be expected. In particular after an incident involving a loss of coolant, large quantities of hydrogen may then be released. Explosive gas mixtures may consequently be generated within the containment enclosure. Unless counter measures are taken, the atmosphere in the containment enclosure may then become enriched with hydrogen to such an extent that, in the event of accidental ignition, the combustion of a relatively large quantity of hydrogen could compromise the integrity of the safety vessel.

Various devices or methods are under discussion for preventing the formation of explosive gas mixtures of this type in the containment enclosure of a nuclear power station. These include, for example, devices such as catalytic recombinators, catalytically and/or electrically operated ignition devices or the combination of the two devices mentioned above as well as methods for permanently inertizing the containment.

When an ignition system is used for eliminating hydrogen from the atmosphere of the containment enclosure, reliable recombination of hydrogen with oxygen by a controlled combustion should be achieved. In this case, a significant pressure build-up as a consequence of virulent hydrogen combustion should be reliably avoided. An ignition system of this type is then customarily configured in such a way as to ensure reliable ignition of hydrogen even at the upper ignition limit of a gas mixture, that is to say in a gas mixture that has a comparatively high hydrogen concentration.

European Patent 0 596 964 discloses a combined catalyst/ignition system for the recombination of hydrogen in a gas mixture. In this system, heat obtained during the catalytic recombination of hydrogen on a catalyst body is fed to an ignition device and used there to ignite hydrogen. However, in a combined catalyst/ignition system of this type, the hydrogen is not ignited until an ignition delay has elapsed after the release of the hydrogen. The reason for this is that, after the hydrogen is initially released, some time is needed until the catalyst body is heated enough to permit ignition of the hydrogen. The effect of this time delay is that, in the case of fast gas displacement processes inside the containment enclosure, the hydrogen does not ignite until comparatively high hydrogen concentrations have been produced.

An ignition system for controlled ignition of a hydrogen-containing gas mixture, disclosed by European Patent 0 289 907 contains a spark igniter which can be supplied via an integral energy store. The ignition system is in this case provided with a stand-alone energy store, so no supply lines are required. The energy store provided in this case is, in particular, a dry battery. However, because of the capacity of the integral energy store, this ignition system is suitable only for a limited operating time. In particular with early excitation of the spark igniter, there is only a restricted possibility of controlled ignition of the hydrogen in the course of an incident in which hydrogen is later released. In addition, this ignition system likewise does not react to the release of hydrogen until after an ignition delay has elapsed. The possibility of long-term operation of the ignition system, which would be needed to cover all conceivable incident scenarios, is also subject to restrictions. Furthermore, precautionary activation of the ignition system actually in advance of a developing incident from an external station, for example the control room of a power station facility, is not possible.

SUMMARY OF THE INVENTION

It is accordingly an object of the invention to provide a safety vessel of a nuclear facility having an ignition system for the recombination of hydrogen in a gas mixture which overcomes the above-mentioned disadvantages of the prior art devices of this general type, which is protected particularly well against the formation of an explosive gas mixture. In this regard, an ignition system with a plurality of spark igniters for the recombination of hydrogen in the gas mixture, in particular for the containment atmosphere of the nuclear facility, with which reliable ignition of the ignitable gas mixture is ensured even in the case of comparatively fast gas displacement processes is also to be provided.

With the foregoing and other objects in view there is provided, in accordance with the invention, a safety vessel of a nuclear facility, including a safety vessel body having an interior formed therein; and an ignition system having a plurality of spark igniters for a recombination of hydrogen in a gas mixture disposed in the interior of the safety vessel body, each of the plurality of spark igniters is a high-speed igniter with an operating frequency in excess of about 10 Hz.

For a safety vessel of the type mentioned above, the object is achieved according to the invention in that each spark igniter is configured as a high-speed igniter with an operating frequency in excess of about 10 Hz.

This being the case, the invention is based on the idea that, for reliable ignition of the gas mixture even in the case of fast gas displacement processes, direct ignition of the gas mixture flowing past the, or each, spark igniter should be ensured even in the case of a flow speed in excess of about 10 m/s. For reliable direct ignition of a gas mixture flowing with such a high flow speed, the spark igniters are configured as high-speed igniters with a correspondingly high operating frequency. By virtue of the high speed, the surrounding gas mixture is furthermore strongly pre-ionized, so that the ignition probability increases and reliable ignition is thereby ensured as soon as the lower ignition limit of the gas mixture has been exceeded. The loading due to combustion is in this case much less in comparison with later ignition.

In an advantageous configuration, the spark igniters are then configured as low-energy igniters with an operating power of less than 10 W, preferably less than 5 W. It is thereby possible to supply the spark igniters with power reliably using particularly simple devices. It is then possible, in particular, to provide power supply cables having a particularly small cable cross-section. The feed-throughs needed for the cables through the safety vessel of the power station facility can thereby be configured with correspondingly small dimensions.

In order to ensure reliable ignition of the ignitable gas mixture both in the event of a temporary failure of external units and when the operating time of the ignition system is particularly long, it is advantageous if the spark igniters are connected together in groups in order to supply them with energy. A group of spark igniters being connected to an intermediate energy store common to them, and the intermediate energy stores being connected to a central power supply unit. It is then possible, for example, for a group of about 10 to 20 spark igniters to be connected to each intermediate energy store. As an alternative, however, all the spark igniters may be connected to a single intermediate energy store.

In a two-stage power supply system of this type, independence of the power supply to the spark igniters with respect to external units is ensured for at least a transitional time through the intermediate energy stores. On the other hand, the ignition system is furthermore suitable for a particularly long working time of, for example, in excess of 5 days, since the intermediate energy stores can be recharged via the central power supply. With a power supply system of this type, a further possibility is for the intermediate energy stores to be activated only when the central power supply fails, so that the availability period of the intermediate energy stores is particularly long. The central power supply may, for example, be a battery system, a back-up diesel generation network or a separate power unit.

Dry batteries may in this case be provided as the intermediate energy stores. Advantageously, however, the intermediate energy stores are configured as low-voltage accumulators. The two-stage power supply system also permits, for example, precautionary triggering of the ignition system even when the hydrogen concentrations are still comparatively low, without the working time of the ignition system being restricted in the case of an incident lasting a long time. The ignition system is therefore particularly flexible to use, in particular in view of the stringent safety requirements for avoiding the formation of explosive gas mixtures in the containment enclosure of the nuclear facility.

For a particularly reliable response of the ignition system to an incipient release of hydrogen, each intermediate energy store expediently contains an automatic trigger that, as a sensor for the hydrogen being released, has a catalytically coated temperature sensor and/or an integral pressure switch or sensor. In other words, it is expedient if the triggers for the spark igniters are disposed not in the spark igniters themselves, but instead in the intermediate energy stores. The spark igniters can then be configured particularly compactly. It is thereby possible to protect the spark igniters particularly effectively, using simple devices, against external temperature and radiation effects as well. In particular if the configuration of the hydrogen sensors is a redundant one, prompt and reliable early detection of the formation of hydrogen is then ensured.

In order for the ignition system to work particularly reliably, even under a wide variety of incident scenarios, it is expedient to provide its essential components with cooling devices that reliably prevent a maximum permissible temperature being exceeded for the relevant components. To this end, each intermediate energy store expediently has a cooling unit, such that the working temperature can be kept reliably below about 140° C., preferably 100° C., under a wide variety of incident scenarios. An intermediate energy store provided with a cooling unit of this type can also be fitted inside the safety vessel of the nuclear facility. The transmission device for supplying the spark igniters connected to the respective intermediate energy stores with ignition energy can thereby be configured with particularly short transmission paths. The high-temperature stability of the ignition system can then be further improved by additional thermal protection using extra insulation, using extended electrodes and by using metal-clad cables with mineral insulation.

In an advantageous configuration, the housing of each spark igniter is configured to cool the spark igniter particularly well even when exposed to elevated temperatures or large amounts of radiation. For this purpose the housing of each spark igniter expediently contains an insulating casing. In this case using a double-casing construction, it is possible to provide an air gap or vacuum insulation, or alternatively an insulant that withstands thermal loading and radiation. Each spark igniter then advantageously also has an internal housing configured to protect its ignition electronics from radiation.

Furthermore, each spark igniter is expediently equipped with an integral heat sink, by which the radio frequency electronics of the spark igniter which are provided for triggering the ignition can be kept at a temperature of less than about 150° C. even when exposed to varying temperatures or amounts of radiation, for example in a high temperature situation with a continuous flame. A particular example of an integral heat sink which is suitable in this case is a water bath which is provided in the respective spark igniter and in which, when heat is put in, the water evaporates and cools the ignition electronics of the spark igniter by taking in the heat. A heat sink configured in this way operates autonomously and independently of external units, so that particularly reliable operation of the respective spark igniters is guaranteed. This ensures that the spark igniters, configured as high-speed igniters, are simple and reliable to use even under extreme incident conditions.

In order to limit the temperature of the ignition electronics particularly reliably in the long term, each spark igniter then advantageously has a respective coolant discharge line which can be closed off using a safety valve. It is then possible for coolant, for example evaporated water from the water bath provided as a heat sink, to be discharged in metered fashion from each spark igniter, in such a way as to guarantee reliable cooling by evaporating the coolant, even over long periods of time.

It is in this case expedient for both a plurality of spark igniters and the intermediate energy stores assigned to them to be disposed in the interior of the safety vessel. For particularly flexible and reliable recombination of accumulating hydrogen, it is in this case possible to use further recombination devices, for example catalytic recombinators, in addition to the spark igniters.

The advantages achieved with the invention consist, in particular, in the fact that by configuring the spark igniters as high-speed igniters with an operating frequency in excess of about 10 Hz, reliable early ignition of the ignitable gas mixture is ensured even in the case of fast gas displacement processes. By virtue of the strong pre-ionization of the gas mixture in the region of the electrodes of the spark igniter on account of the high cycle frequency, the ignition probability for the gas mixture is also particularly high. Reliable early ignition is therefore also ensured even in relatively slow-moving atmospheres. By virtue of the two-stage power supply to the ignition system, it is on the one hand possible for the ignition system to work with temporary autonomy, independent of external sources, while on the other hand full functional capability of the ignition system is ensured even for long periods of operation. In particular when the spark igniters are supplied with power via the central external power supply unit, the ignition system can also be triggered as a precaution, even when the hydrogen concentrations are still particularly low. At the same time, disposing the triggers for the spark igniters and the power supply for the spark igniters in the intermediate energy stores makes it possible for the spark igniters to have a particularly compact structure. The spark igniters can therefore be used locally with a particularly high degree of flexibility, so that the ignition system can be tailored particularly well to some expected spatial distribution governing the release of hydrogen.

Other features which are considered as characteristic for the invention are set forth in the appended claims.

Although the invention is illustrated and described herein as embodied in a safety vessel of a nuclear facility having an ignition system for the recombination of hydrogen in a gas mixture, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
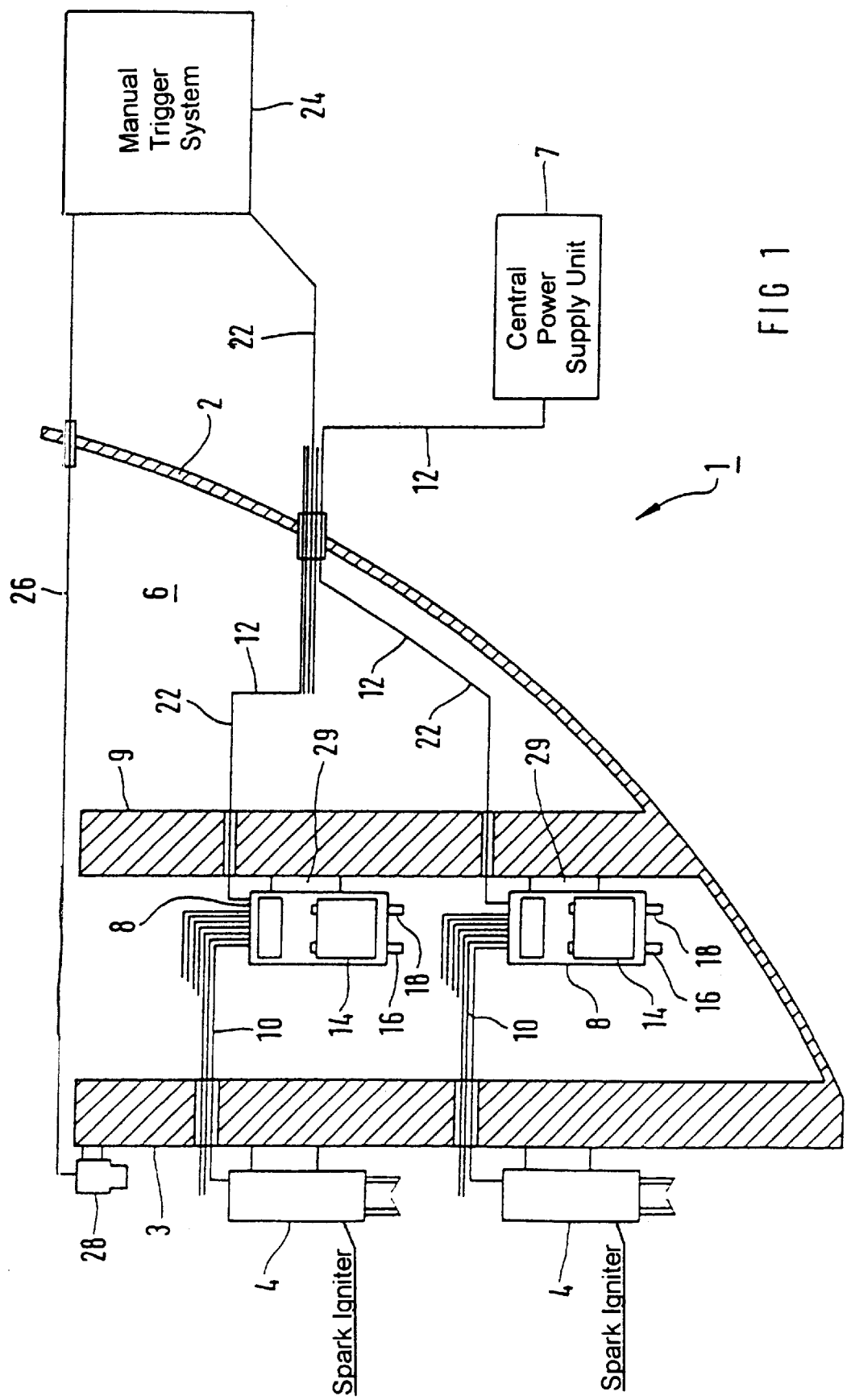
FIG. 1 is a diagrammatic diagram of a detail of a safety vessel of a nuclear facility with an ignition system for the recombination of hydrogen in a gas mixture according to the invention.

In all the figures of the drawing, sub-features and integral parts that correspond to one another bear the same reference symbol in each case. Referring now to the figures of the drawing in detail and first, particularly, to FIG. 1 thereof, there is shown an ignition system 1 intended for the recombination of hydrogen in a gas mixture, specifically in the containment atmosphere of a safety vessel 2, excerpts of which are represented in FIG. 1, of a nuclear facility. For this purpose, the ignition system 1 contains a plurality of spark igniters 4 which are disposed inside the safety vessel 2 on an internal wall 3, and each of which is configured for on-demand production of ignition sparks for a controlled combustion of hydrogen released in the interior of the safety vessel 2.

In order to be supplied with ignition energy, the spark igniters 4 are connected to a two-stage power supply system 6. The power supply system 6 contains a plurality of intermediate energy stores 8 connected to a central power supply unit 7. In the illustrative embodiment, low-voltage accumulators are provided as the intermediate energy stores 8. As an alternative, the intermediate energy stores 8 may also be configured as dry batteries. The intermediate energy stores 8 are suspended inside the safety vessel 2, from a further internal wall 9.

A group of about 15 spark igniters 4 is connected to each of the intermediate energy stores 8. In other words, the spark igniters 4 are connected together in groups in order to supply them with energy, each group of spark igniters 4 being connected to the intermediate energy store 8 common to them. The grouped connection of the spark igniters 4 is symbolized in FIG. 1 by the bundled representation of power transmission lines 10. The power transmission lines 10 are in this case, in an embodiment suitable for high temperatures, configured as metal-clad cables with mineral insulation.

On an input side, the intermediate energy stores 8 are connected to the central power supply units 7 via supply lines 12 fed through the safety vessel 2. Each of the intermediate energy stores 8 is configured for an autonomy time of about 24 hours and can be recharged via the central power supply unit 7. In the illustrative embodiment, a back-up diesel generation network is provided as the central power supply unit 7. As an alternative, it is also possible for a separate battery or a different power generator to be provided.

However, each of the intermediate energy stores 8, which are respectively connected via the line 12 to the central power supply unit 7, contains an automatic switch 14 which is intended to trigger an ignition process and has a catalytically coated temperature sensor 16 and an integral pressure switch 18. The ignition system 1 is therefore equipped for redundant automatic ignition activation as a function of the pressure and/or the temperature in the interior of the safety vessel 2. In addition, each of the intermediate energy stores 8 is connected via a signal line 22 to a manual trigger system 24. The trigger system 24 may in this case for example form part of the control room of a nuclear power station on an input side, the trigger system 24 is connected via a signal line 26 to a hydrogen sensor 28. The power supply to the spark igniters 4 via the intermediate energy stores 8 respectively connected upstream of them may in this case alternatively be triggered via the automatic trigger 14 respectively integrated in the intermediate energy stores 8, or via the manual trigger system 24.

Furthermore, each of the intermediate energy stores 8 is equipped with an integral cooling unit 29 in the form of a heat sink. The cooling unit 29 is in this case configured in such a way that a temperature of 100° C. in the interior of the intermediate energy store 8 is not exceeded even in the case of an incident in which a large amount of heat is released. The intermediate energy stores 8 can therefore be operated reliably in a wide variety of incident scenarios, even in the embodiment as low-voltage accumulators.

Figure 2:
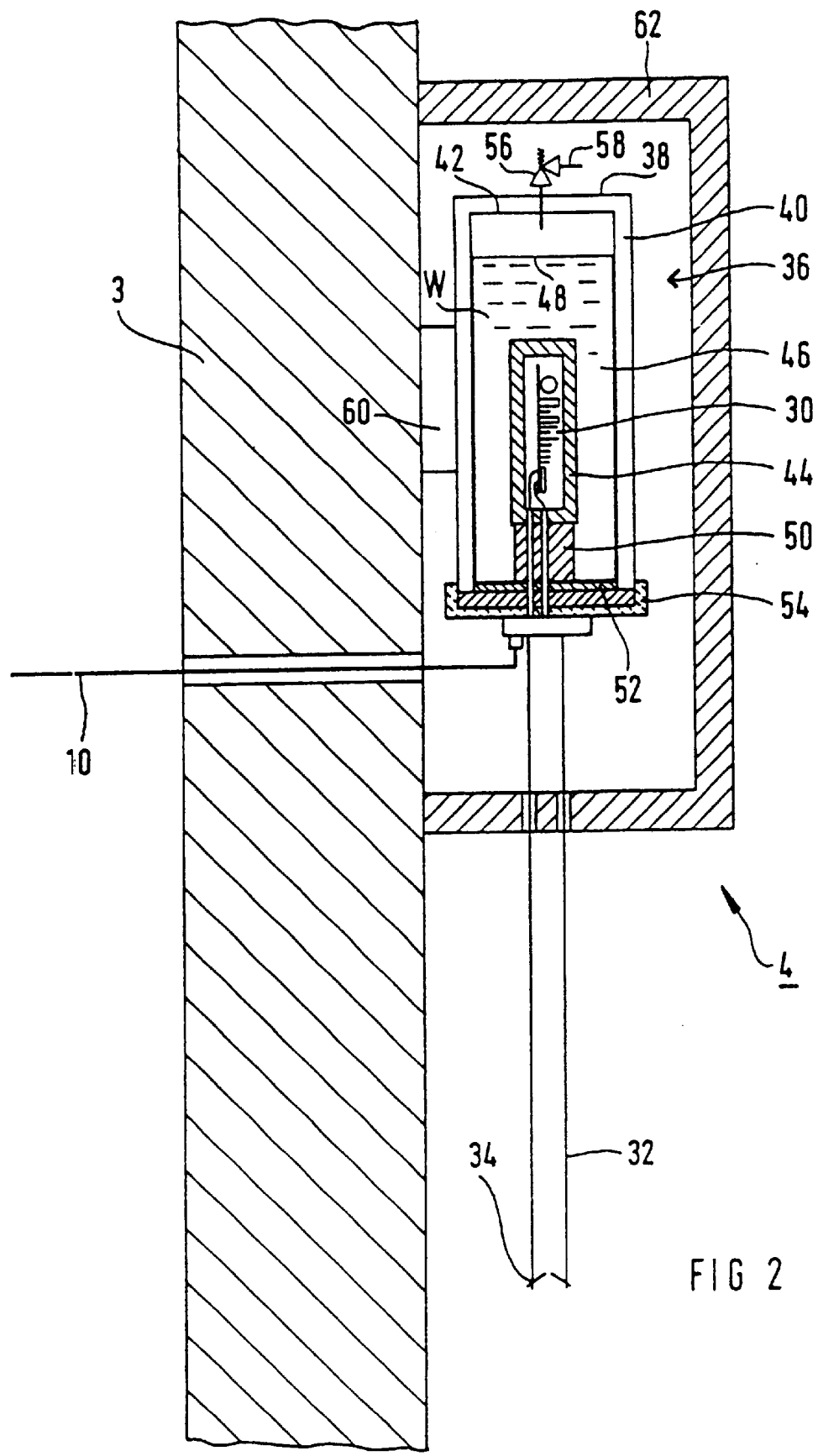
FIG. 2 is a sectional view of a spark igniter of the ignition system from FIG. 1.

The spark igniter 4 of the ignition system 1 is schematically represented in FIG. 2. The spark igniter 4 is configured as a high-speed igniter with an operating frequency of about 100 Hz and as a low-energy igniter with an operating power of about 5 W, and for this purpose contains ignition electronics 30 whose essential components are a clock generator, a high-voltage transistor, a charging capacitor and an ignition transformer. The ignition electronics 30 are connected on the input side to the power supply line 10 which is connected to the intermediate energy store 8 allocated to the spark igniter 4. On an output side the ignition electronics 30 are connected to a spark gap 32 whose end 34 projects in a region of the interior of the safety vessel where an incident with increased release of hydrogen is to be expected.

The spark igniter 4 contains a multi-layer housing 36 whose outer casing 38 consists of a material which is stable at high temperature, for example VA steel or titanium. An insulating casing 40 which, in the illustrative embodiment, is configured in a double-casing fashion as an air gap between the outer casing 38 and an inner casing 42, is disposed inside the outer casing 38. As an alternative, an insulant that is resistant to high temperatures and radiation and is disposed between the outer casing 38 and the inner casing 42 may also be provided for the insulating casing 40.

Inside the housing 36, the ignition electronics 30 are disposed in an inner housing 44 configured as a radiation screen. An intermediate space 46 between the inner housing 44 and the inner casing 42 is filled in the manner of a water bath up to a level 48 with water W which serves as a heat sink integral to the spark igniter 4

The inner housing 44 is fastened to the housing 36 via a fastening element 50 made of an insulating material. At its end that faces the spark gap 32 and is closed off with a cover 52, the housing 36 is provided with a ceramic heat shield 54.

The interior 46 communicates with the external space of the housing 36 via a discharge line 58 which can be closed off by a safety valve 56.

The housing 36 is suspended via a fastening element 60 from the internal wall 3. The housing 36 suspended via the fastening element 60 from the internal wall 3 is in this case surrounded by a further insulating casing 62 disposed directly on the internal wall.

In the event of an incident inside the safety vessel 2, the fact whether hydrogen has been released is ascertained by the hydrogen sensor 28 or by the temperature sensors 16 and/or the pressure switches 18 provided as sensors. If hydrogen has been released, then the spark igniters 4 are activated manually using the trigger unit 24 or automatically using the automatic triggers 14 integrated in the intermediate energy stores 8. An ignition spark which leads to controlled combustion or recombination of the hydrogen is in this case produced by the spark gap 32 of each spark igniter 4 at its end 34. By virtue of the spark igniter 4 configured as a high-speed igniter with an operating frequency of about 100 Hz, reliable ignition of the hydrogen is in this case ensured even in the case of comparatively fast gas displacement processes with flow speeds in excess of 10 m/s. In addition, by virtue of the high operating frequency of the spark igniters 4, particularly strong pre-ionization of the gas mixture is ensured, so that early ignition directly after the ignition group has been passed is ensured, even in the case of a slow-moving gas atmosphere. The levels of loading due to combustion which follow ignition are therefore particularly low.

The ignition system 1 is configured for particularly high operating safety, even for a wide variety of incident situations. By virtue of the two-stage configuration of the power supply system 6 for the spark igniters 4, the ignition system 1 is suitable both for medium-term autonomous operation and for long-term continuous operation. In medium-term autonomous operation, the power supply for the spark igniters 4 takes place exclusively via the intermediate energy stores 8, which provide for an operating time of at least 24 hours without any extra supply.

Reliable operation of the ignition system 1 is therefore ensured even if external devices fail. Reliable long-term operation of the ignition system 1 is in addition ensured by the central power supply unit 7.

On account of their structure, the spark igniters 4 are configured for a high degree of operating safety even in the event of a wide variety of accident scenarios. The functional safety of the relevant ignition electronics 30 is in this case ensured even at high external temperatures due to the respective incident. This is contributed to, further to the insulating casing 40 provided in the housing 36 of each spark igniter 4, in particular by the integral heat sink in the form of the water W surrounding the internal housing 44 as well. This is because the water W vaporizes as a result of elevated temperature and thereby contributes through its heat of evaporation to cooling the ignition electronics 30. A particularly long working period is in this case ensured by the safety valve 56. This is because the rate at which the vaporized water W is discharged from the housing 36 can be adjusted using the safety valve 56. Even if the supply of water is limited, the integral heat sink is therefore available for a particularly long working period.

We claim:

1. A safety vessel of a nuclear facility, comprising:

a safety vessel body having an interior formed therein;

an ignition system for a recombination of hydrogen in a gas mixture disposed in said interior of said safety vessel body, said ignition system having a plurality of spark igniters being a high-speed igniter with an operating frequency in excess of about 10 Hz;

a central power supply unit; and a plurality of intermediate energy stores connected to said central power supply unit;

said plurality of spark igniters connected together in groups of spark igniters, each of said groups of spark igniters connected to one of said plurality of intermediate energy stores for supplying energy to said groups of spark igniters.

2. The safety vessel according to claim 1, wherein said plurality of spark igniters are low-energy igniters with an operating power of less than 10 W.

3. The safety vessel according to claim 1, wherein said plurality of spark igniters are low-energy igniters with an operating power of less than 5 W.

4. The safety vessel according to claim 1, wherein each of said plurality of intermediate energy stores has an automatic trigger with a catalytically coated temperature sensor.

5. The safety vessel according to claim 1, wherein each of said plurality of intermediate energy stores has an automatic trigger with an integral pressure switch.

6. The safety vessel according to claim 1, wherein each of said plurality of intermediate energy stores has a cooling unit.

7. The safety vessel according to claim 1, wherein each of said plurality of spark igniters has ignition electronics and an internal housing for providing radiation protection for said ignition electronics.

8. The safety vessel according to claim 1, wherein each of said plurality of spark igniter s has a housing with an insulating casing.

9. The safety vessel according to claim 1, wherein each of said plurality of spark igniters has an integral heat sink.

10. The safety vessel according to claim 1, wherein each of said plurality of spark igniters has a discharge line for conducting a coolant and a safety valve disposed in said discharge line for closing off said discharge line.

* * * * *